(12) United States Patent
Carter et al.

(10) Patent No.: US 8,380,040 B2
(45) Date of Patent: Feb. 19, 2013

(54) SYSTEMS AND METHODS OF CAPTURING AND ORGANIZING ANNOTATED CONTENT ON A MOBILE DEVICE

(75) Inventors: Scott Carter, Los Altos, CA (US); Laurent Denoue, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/185,396

(22) Filed: Jul. 18, 2011

(65) Prior Publication Data
US 2013/0022330 A1    Jan. 24, 2013

(51) Int. Cl.
*H04N 5/77* (2006.01)
*H04N 5/93* (2006.01)

(52) U.S. Cl. .................. 386/224; 386/278; 386/290

(58) Field of Classification Search ............. 386/200, 386/224, 248, 278, 282, 285, 290
See application file for complete search history.

(56) References Cited

U.S. PATENT DOCUMENTS
2010/0023553 A1* 1/2010 Gausman et al. .......... 707/104.1

OTHER PUBLICATIONS http://betasiisicoh.com/betalabs/content/whiteboard-share-iphone, 2010.
http://www.docscannerapp.com/iphone/, Mar. 2010.
https://market.android.com/details?id=com.spe..boardtabla, Feb. 2010.
Fleck, M. et al. "From Informing to Remembering: Ubiquitous Systems in Interactive Museum." IEEE Pervasive Computing 1(2), 2002, . pp. 13-21.
Saund, E. et al., "A perceptually-supported sketch editor", UIST, 1994. pp. 175-184.
Wellner, P.D., "Adaptive Thresholding for the DigitalDesk.", Rank Xerox Ltd., 1993.
Carter, S. et al., "Linking digital media to physical documents: Comparing content-based and marker-based tags," IEEE Pervasive Computing, 9(2). 2010, pp. 46-55.

* cited by examiner

*Primary Examiner* — Robert Chevalier
(74) *Attorney, Agent, or Firm* — Sughrue Mion, PLLC

(57) ABSTRACT

Systems and methods are provided for capturing, annotating, organizing and sharing content captured by a mobile device. The content may represent meeting notes on a whiteboard and may be captured by a camera on the mobile device, or by using specialized whiteboard capture software. Regions of the content where a user wishes to add annotations are then identified, after which the user adds annotations, such as written or audio annotations, to the identified regions. The annotated content is then organized into a specific sequence in which the content and the annotations will be presented, and a video is created from the sequence so that the annotated content can be easily shared with, and understood by, other users.

20 Claims, 16 Drawing Sheets

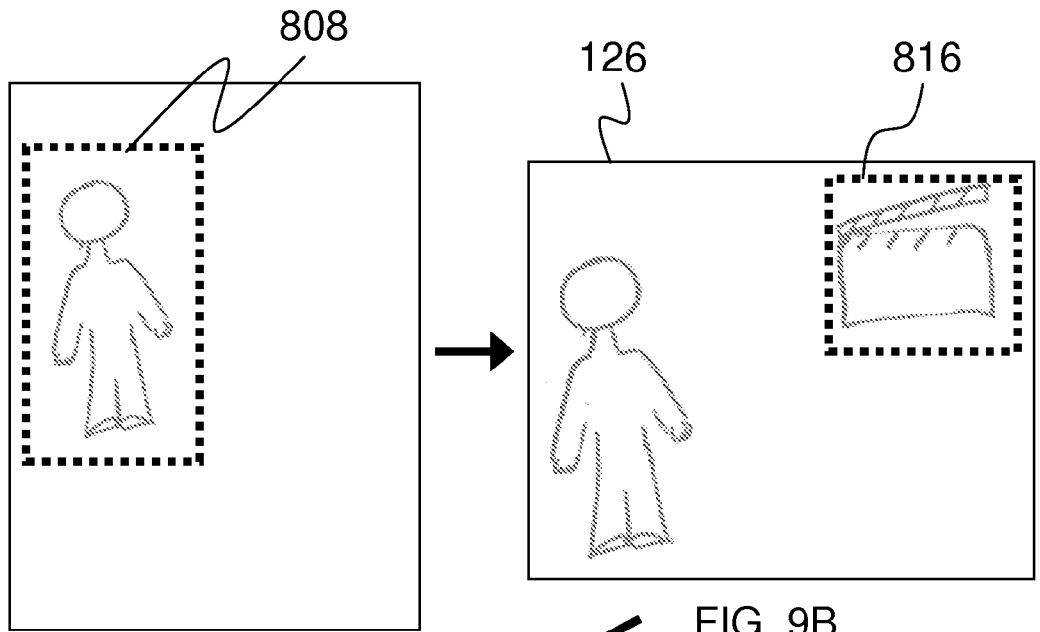
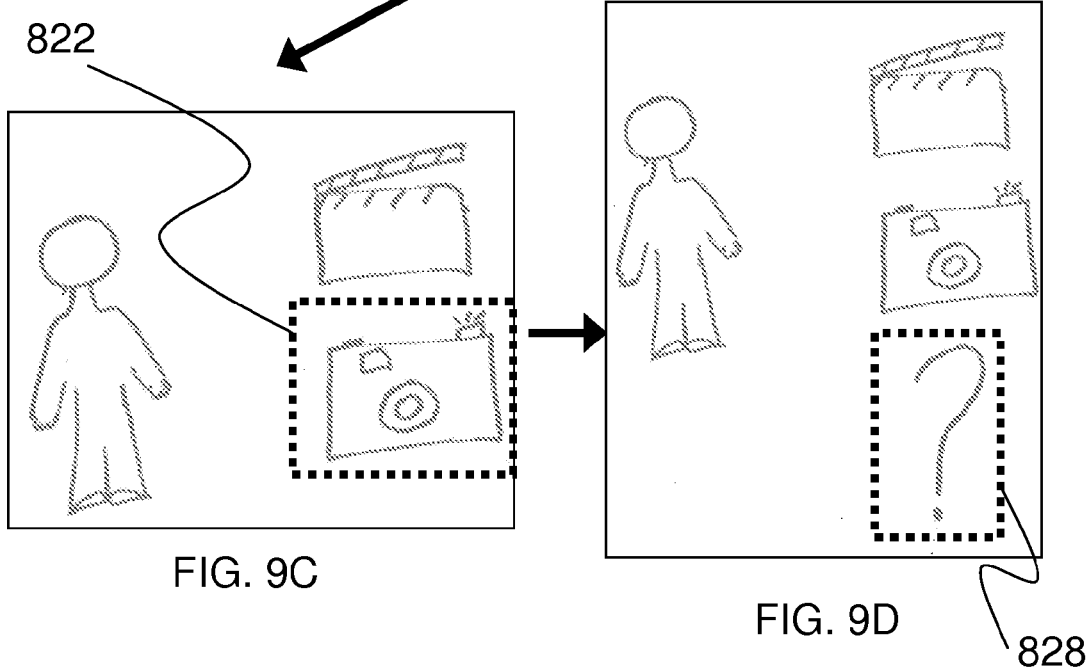
FIG. 9A
FIG. 9B
FIG. 9C
FIG. 9D

SYSTEMS AND METHODS OF CAPTURING AND ORGANIZING ANNOTATED CONTENT ON A MOBILE DEVICE

BACKGROUND

1. Field of the Invention

This invention relates to systems and methods for capturing and organizing annotated content, and more specifically to systems and methods for capturing, annotating, organizing and sharing annotated content using a mobile device.

2. Description of the Related Art

The use of whiteboards is pervasive across a wide range of work domains. Whiteboards enable users to quickly externalize an idea or concept, to facilitate understanding among collaborators and peers, and can serve as a conversational artifact to ground subsequent discussion. Several studies of workplace practice have shown the value of these benefits.

A wide range of commercial and research tools have been developed to marry the affordances of digital tools and usability of whiteboards. Tools to clean images on whiteboards and other sketching surfaces are generally designed to digitally capture content on a whiteboard so that its content can be more effectively utilized outside of the traditional meeting room. Some tools focus on image enhancement, whereas others support perspective correction and optical character recognition (OCR)

Other applications allow users to annotate "cleaned images," or those which have been binarized to change all non-content areas (shadows, glare, etc) to pure white. However, all of the known applications ultimately produce a standalone document that has been separated from the context of its creation. This makes the annotated documents difficult to organize. Furthermore, if they are shared with others, the content is difficult to understand.

SUMMARY

Systems and methods are provided for capturing, annotating, organizing and sharing content captured by a mobile device. The content may represent meeting notes on a whiteboard and may be captured by a camera on the mobile device, or by using specialized whiteboard capture software. Regions of the content where a user wishes to add annotations are then identified, after which the user adds annotations, such as written or audio annotations, to the identified regions. The annotated content is then organized into a specific sequence in which the content and the annotations will be presented, and a video is created from the sequence so that the annotated content can be easily shared with, and understood by, other users.

In one embodiment of the invention, a system for capturing and organizing annotated content comprises a content capturing unit which captures an image of content using a camera on a mobile device; a region defining unit on the mobile device which defines and identifies at least one region of the image which includes captured content to be annotated; an annotation unit on the mobile device which receives user-created annotations which correspond to the at least one region of the captured content; and a video creation unit located on a server connected with the mobile device which organizes the captured content and the user-created annotations into a specific sequence and creates a video of the specific sequence.

The content capturing unit may obtain information related to the content from a content information server on a network connected with the mobile device.

The content may be information which appears on a whiteboard, and wherein the content capturing unit receives the entire content of the whiteboard using a code or electronic tag located around the whiteboard that is identified by the mobile device as a link to an image of the entire content of the whiteboard on a network connected with the mobile device.

The region defining unit may extract bounding boxes of at least one object in the content and receives a user input at a location in the at least one region which identifies a surface area of the object.

An artificial bounding box may be created with a surface area equal to a radius of a touch area if the user input does not intersect a bounding box.

The user-created annotations may be audio recordings created on the mobile device.

The user-created annotations may be written notations created on the mobile device.

The video creation unit may generate a mask which hides portions of the at least one region or user-created annotations so that the hidden portions of the at least one region or user-created annotations are progressively revealed during playback of the video.

The system may further comprise a sharing unit which distributes the video to at least one second user.

The sharing unit may distribute the video to users which are located in close proximity to the content.

In another embodiment, a method for capturing and organizing annotated content comprises capturing an image of content using a camera on a mobile device; defining and identifying at least one region of the image on the mobile device, the at least one region including captured content to be annotated; receiving user-created annotations on the mobile device, wherein the annotations correspond to the at least one region of the captured content; and organizing the captured content and the user-created annotations into a specific sequence and creating a video of the specific sequence using a server with a processor and a memory which is connected with the mobile device.

The method may further comprise obtaining information related to the content from a content information server on a network connected with the mobile device.

The content may be information which appears on a whiteboard, and wherein the entire content of the whiteboard is received using a code or electronic tag located around the whiteboard that is identified by the mobile device as a link to an image of the entire content of the whiteboard on a network connected with the mobile device.

The at least one region of the image may be identified and defined by extracting bounding boxes of at least one object in the content and receiving a user input at a location in the at least one region which identifies a surface area of the object.

An artificial bounding box may be created with a surface area equal to a radius of a touch area if the user input does not intersect a bounding box.

The user-created annotations may be audio recordings created on the mobile device.

The user-created annotations may be written notations created on the mobile device.

The organizing of the captured content and the user-created annotations into a specific sequence may comprise generating a mask which hides portions of the at least one region or user-created annotations so that the hidden portions of the at least one region or user-created annotations are progressively revealed during playback of the video.

The method may further comprise distributing the video to at least one second user.

The video may be distributed to users which are located in close proximity to the content.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention.

Specifically:

FIGS. 9A-9D illustrate a sequence of images which correspond to a video created to reveal the selected regions and their corresponding annotations as the video progresses, in accordance with one embodiment of the invention.

DETAILED DESCRIPTION

In the following detailed description, reference will be made to the accompanying drawings. The aforementioned accompanying drawings show by way of illustration and not by way of limitation, specific embodiments and implementations consistent with principles of the present invention.

Embodiments of the invention described herein provide for capturing, annotating, organizing and sharing content captured by a mobile device. The content may represent meeting notes on a whiteboard and may be captured by a camera on the mobile device, or by using specialized whiteboard capture software. Regions of the content where a user wishes to add annotations are then identified, after which the user adds annotations, such as written or audio annotations, to the identified regions. The annotated content is then organized into a specific sequence in which the content and the annotations will be presented, and a video is created from the sequence so that the annotated content can be easily shared with—and understood by—other users.

I. System Overview

In one embodiment, the system connects an image of content taken by the mobile device to external services which identify related content and provide further information on the captured content in order to improve the organization of the captured content. Once the content is captured, image processing and minimal user input are used to define at least one region which the user can then annotate using the mobile device. The user then may create separate annotations for each identified region, such as written or audio annotations. Once the annotations are added, the image, which includes the identified regions and the corresponding annotations, is sent to a server and "cleaned" to create a mask which excludes regions of the image which are not annotated. The server combines the image with the mask to create a video that progressively reveals the contents of the identified regions and the corresponding annotations.

The user may then share the video with other users, including users who are identified based on their proximity to the location of the content.

Figure 1:
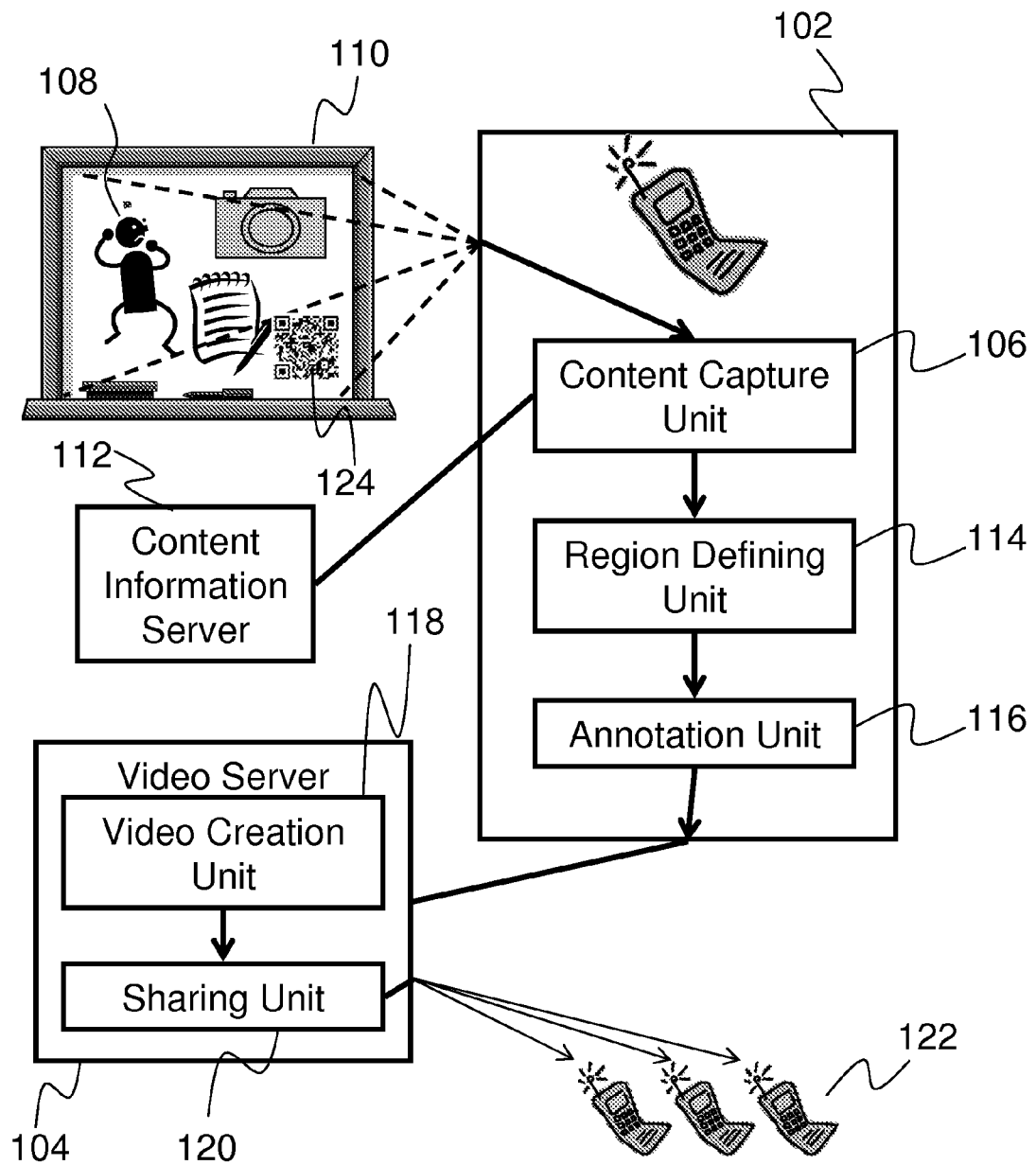
FIG. 1 is a block diagram of a system for capturing and organizing annotated content, according to one embodiment of the invention.

One embodiment of the system for capturing and organizing annotated content is illustrated in FIG. 1. The basic components of the system include a mobile device 102 and a video server 104, which are connected with each other over a network or directly through a cable. The system includes a content capturing unit 106 which captures an image of content 108. The content capturing unit 106, in one embodiment, is a camera contained within, or attached with, the mobile device 102, such a wireless phone equipped with a camera. In this embodiment, the content 108 is information written on a whiteboard 110. The content capturing unit 106 may obtain information related to the captured content from a content information server 112 on a network connected with the mobile device, as will be described in further detail below.

Once the image has been captured, a region defining unit 114 defines and identifies at least one region of the image which the user would like to annotate. Each of the defined regions may then be annotated individually by the user using the annotation unit 116, which receives annotations created by the user and associates the annotation with a particular region. After the user has created the annotations, the image and annotations are transferred to the video server 104, where a video creation unit 118 organizes the identified regions and associated annotations on the image and uses a mask so that a video may be created which progressively reveals the content and annotations. Once the video is created, a sharing unit 120 shares the video with other users 122.

Figure 2:
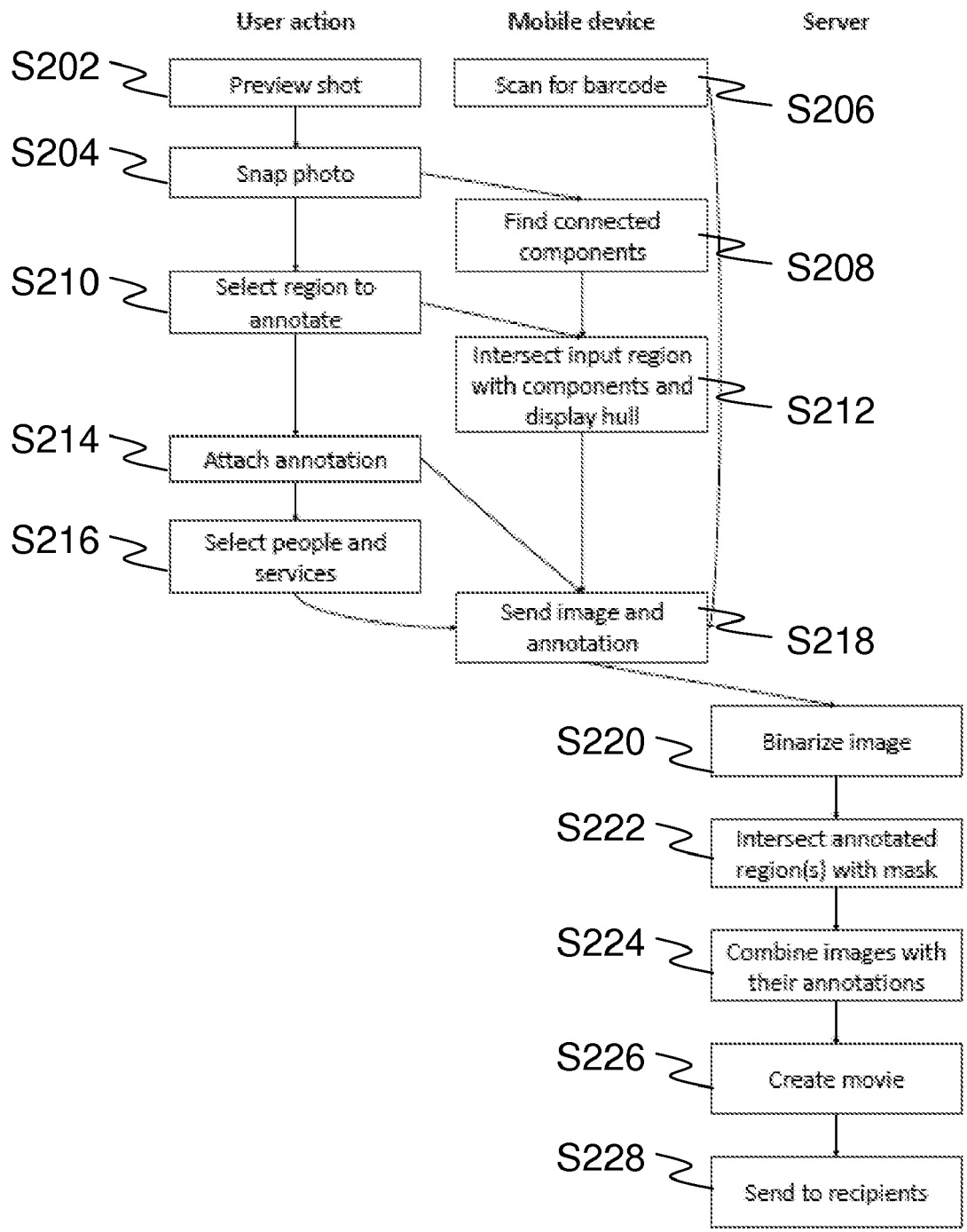
FIG. 2 is a partitioned flow chart of a method for capturing and organizing annotated content, illustrating the data flow between a user, the mobile device and a server, according to one embodiment of the invention.

One embodiment of a method for capturing and organizing annotated content is illustrated in FIG. 2. The method illustrated in FIG. 2 is partitioned into columns to indicate which steps may be taken by the user, by the mobile device or by the server. In step S202, the user can preview a shot (image) of content before taking a picture (step S204) of the content. As an alternative to the user taking a picture of the content, the user may be provided with alternative image capturing technologies, such as a barcode 124 (see FIG. 1) placed on or near the content, which if scanned (step S206) will obtain an image of the content from a third party service, that for example may reside on the content information server 112. If the barcode is scanned, the method may proceed past the steps of capturing the image, identifying regions and adding annotations, as the third party service may have already accomplished these steps separately. At least one region that the user can annotate is then identified by first finding connected components (step S208), receiving an input selection from the user (step S210) and then intersecting the input region with the connected components (step S212) to display a hull, or outline of an object in the defined region.

Having defined at least one region on the image, the user may then annotate the region (step S214) by creating annotations relating to each of the at least one identified regions. At this point, the user has the option to select people and services with which to share the annotated image (step S216), although in one embodiment, the annotations and the identified regions of the image are sent by the mobile device to the server (step S218) without requiring separate action by the user.

In step S220, the server uses an image cleaning algorithm to binarize the image and create a mask which excludes all regions of the image that are not annotations. The server then intersects the annotations with the mask (step S222) to create a first frame, and subsequently adds additional annotations which correspond to each identified region (step S224), thereby creating a specific sequence of frames which are then combined to create a video (step S226). The video may then be sent to other users (step S228) who can view the annotated content in a succinct and organized manner.

II. Capturing and Identifying Content

Figure 3:
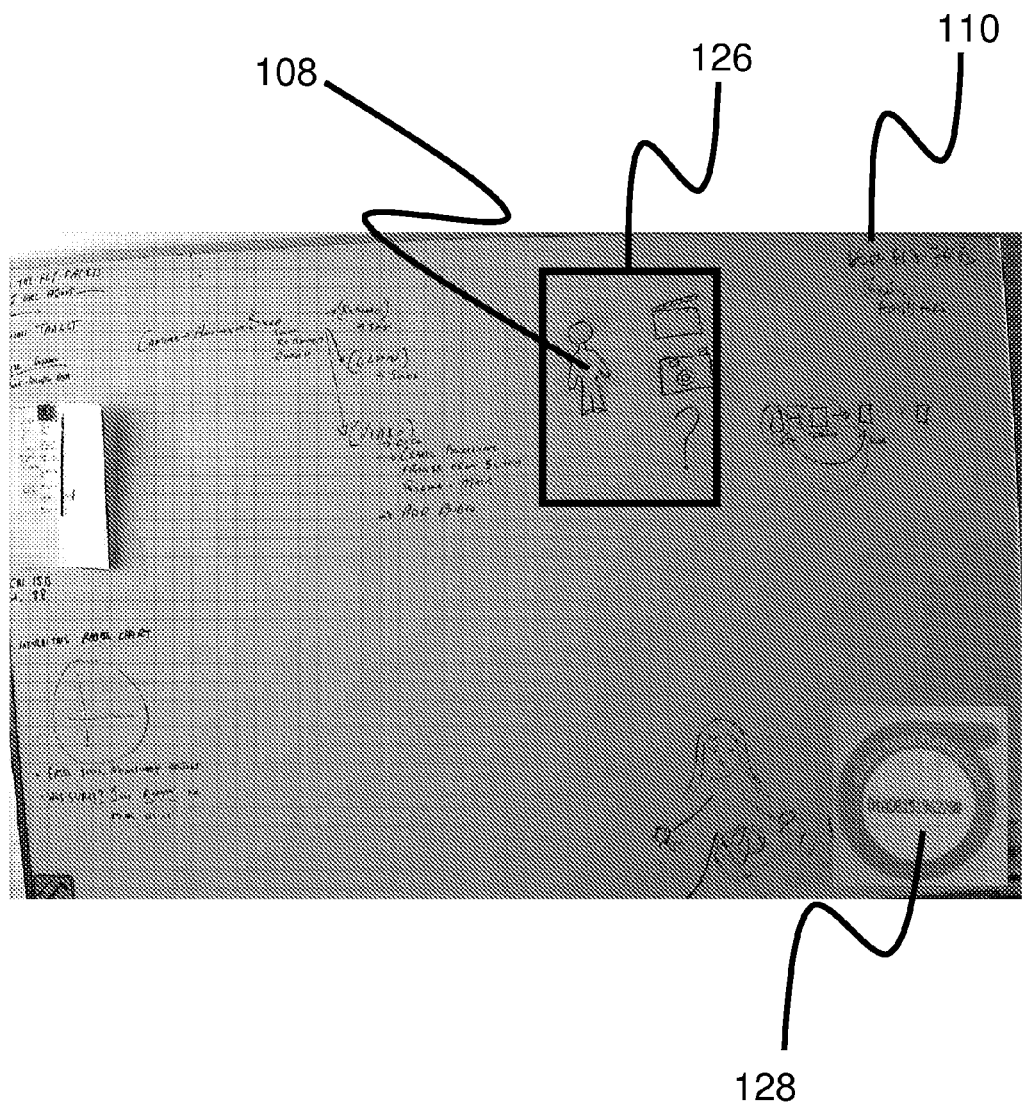
FIG. 3 is an illustration of a whiteboard where a picture of a portion of the whiteboard taken by the mobile device is used to match to a picture of the entire whiteboard, according to one embodiment of the invention.

The content capture unit 106 is a mobile tool residing on the mobile device that supports photo capture of content. The content can be any information from any location that the user wishes capture and annotate. In the exemplary embodiment described herein and illustrated in FIG. 3, the content 108 will be the information on a whiteboard 110, which is frequently used to capture information discussed in a meeting room during a meeting between users.

In one embodiment, the mobile device captures an image 126 of the content using a camera incorporated within the mobile device, although the mobile device could also be a standalone digital camera with networking capabilities. One of skill in the art will appreciate that there are numerous types of mobile devices which can accomplish the systems and methods described herein, including cellular phones, smartphones, tablets, laptop computers, netbook computers, digital cameras and video cameras.

In one embodiment, a mobile tool located on the mobile device captures an image of content and connects the image with an archival or other related tool available in smart spaces, or environments capable of automated actions to archive user content. These archival tools may include annotation tools that help users explain the contents, so that the user may not need to add their own annotations. The information on the archival tools may be stored on the content information server 112 and accessed by the mobile device 102 over a network.

In another embodiment, the mobile device is capable of interacting with a near field communication (NFC) tag 128 which is placed on or near the content. The information in the NFC tag includes a whiteboard identity which can be used by whiteboard archiving tools to find an already-captured image of the content on the whiteboard. In another embodiment, when the mobile device comes within a certain proximity of the NFC tag, the information from the tag allows the mobile device to instruct a whiteboard archival tool to capture and share an image. The system issues commands to the whiteboard capture service using NFC tags to automatically initiate a whiteboard capture that will immediately appear in the image stream of the mobile device.

The system can also use NFC tags to instruct smart environments to automatically capture and share images, interactively decode barcodes attached to image surfaces to tag images, and connect to indoor location services to send captured images to nearby users.

In an alternative embodiment, a visible barcode located on a portion of the image may be captured along with the image and then decoded to add some metadata to the captured image.

Figure 4:
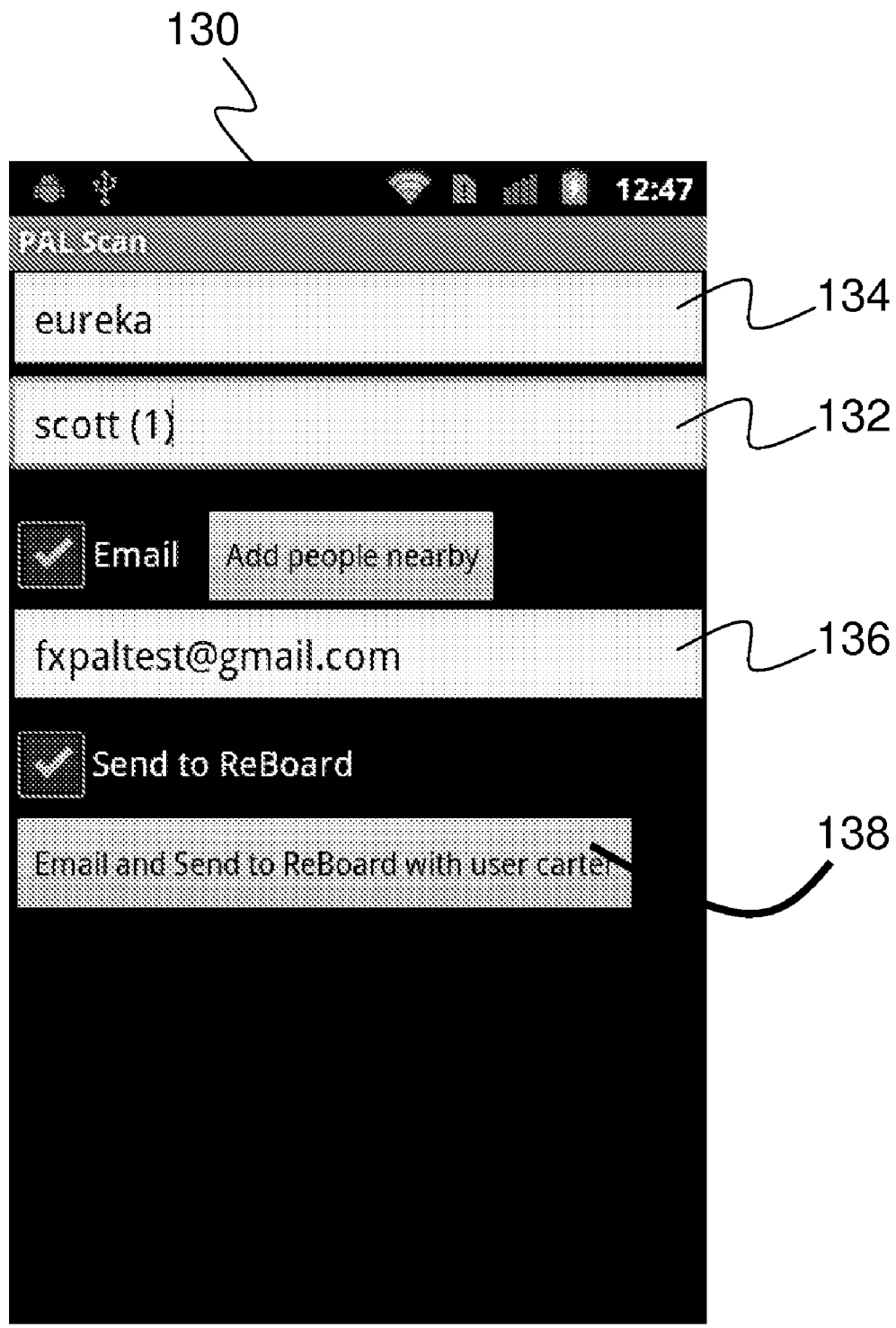
FIG. 4 illustrates a graphical user interface (GUI) where the user can send captured media to another person or an outside service, according to one embodiment of the invention.

In one embodiment, the server can optionally send the image 126 (and optionally its identity) to a whiteboard capture organization service which can use the identity information and other features of the image to identify a larger image of the entire content of the whiteboard 110. FIG. 4 illustrates one embodiment of a graphical user interface (GUI) 130 which has filled in the identity 132 of a particular board where the image was taken, provided a name 134 for the image and provided options for sending the image to another user via email 136 or pressing a button 138 to send the image to a whiteboard capture service. Although not illustrated, the user may also be able to send the image to an image cleaning service (described further below).

III. Defining Regions for Annotations

Once the image of the content is captured and identified, the region defining unit 114 defines regions of content from the whiteboard that users can annotate from the mobile device. A combination of image processing techniques and user input are used to define the regions in the whiteboard.

Figure 5:
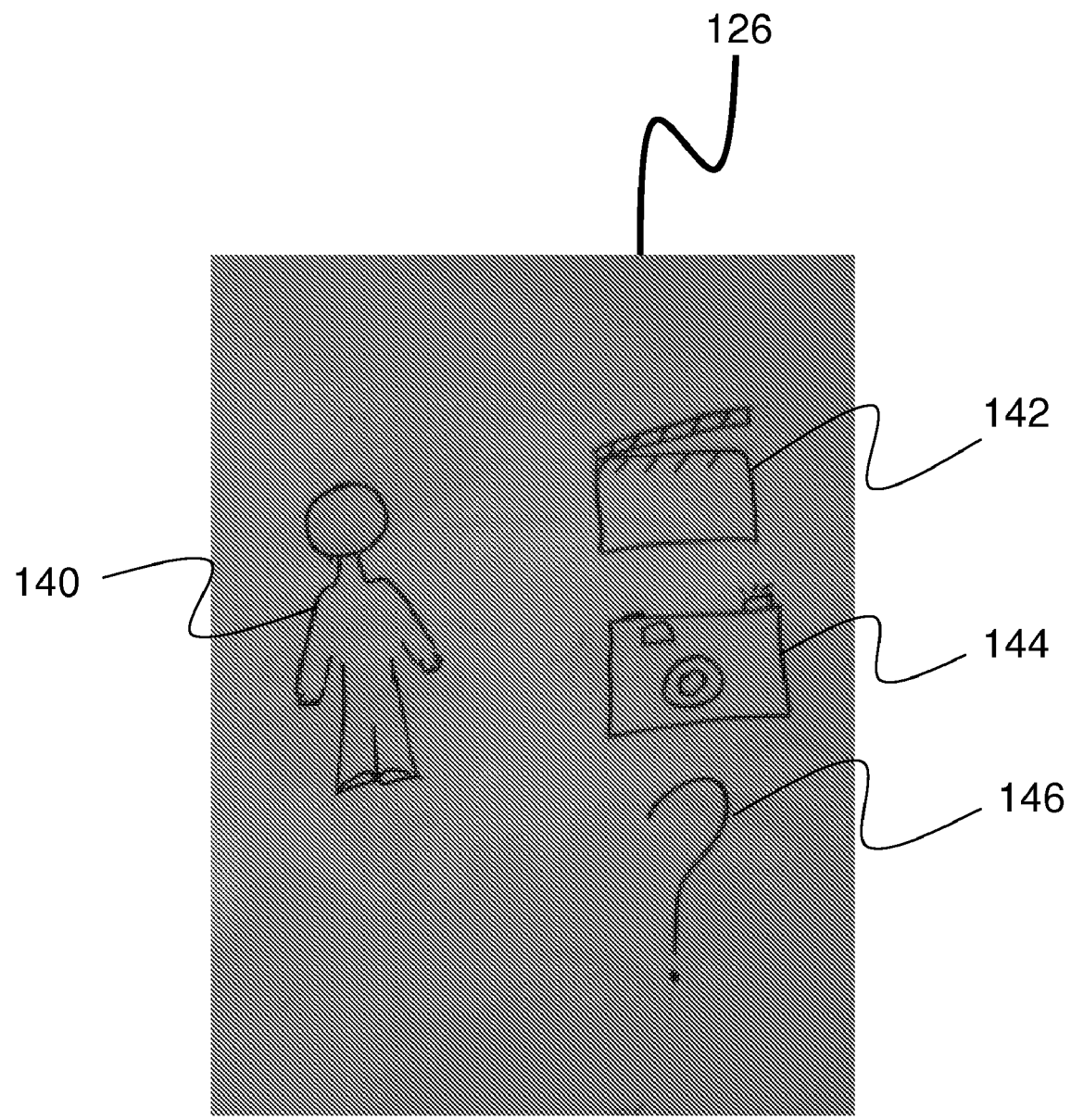
FIG. 5 is an illustration of an unmodified image of a portion of the whiteboard as captured by the mobile device, according to one embodiment of the invention.
Figure 6A:
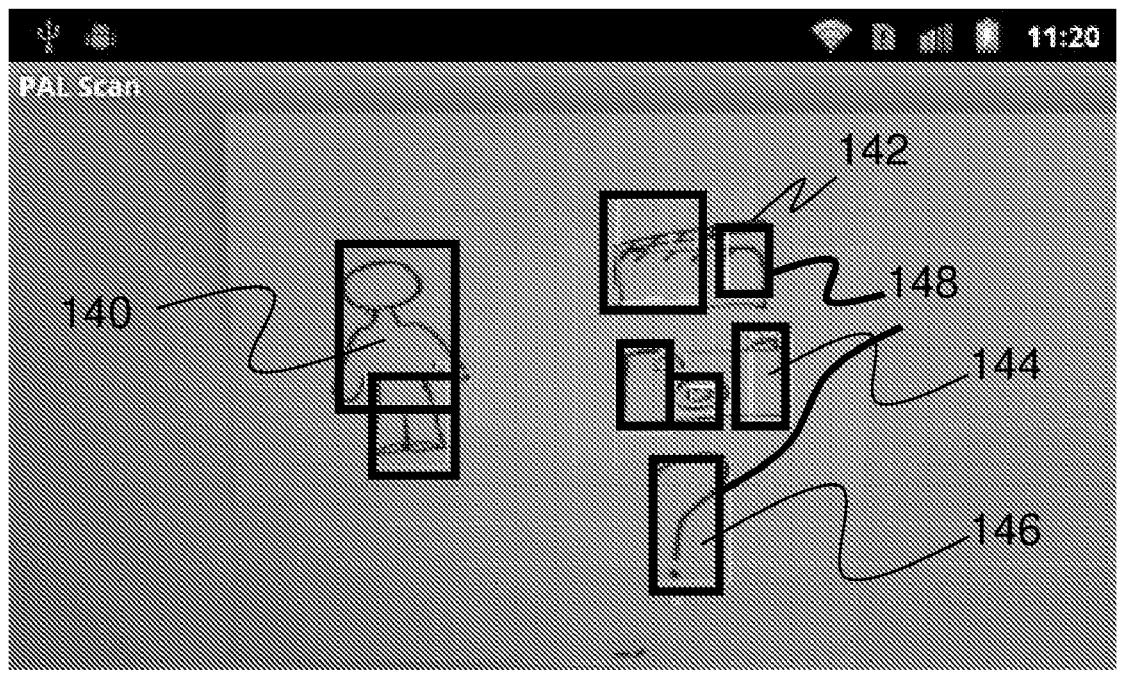
FIG. 6A illustrates detected objects of the unmodified image of FIG. 5, according to one embodiment of the invention.

Consider the image 126 captured from a whiteboard, as illustrated in FIG. 5. In one embodiment, upon taking the photo, the mobile application scales the image, binarizes it using an adaptive histogram threshold, runs it through a standard connected components algorithm to attempt to identify the objects (140, 142, 144 and 146) of the image, and extracts bounding boxes 148 (see FIG. 6A) of the resulting components. The result is similar to FIG. 6A, in which each of the four different objects 140, 142, 144 and 146 in the image have one or more roughly grouped connected components. More specifically, object 140 has one component, object 142 has two components, and objection 144 has several components.

Figure 6B:
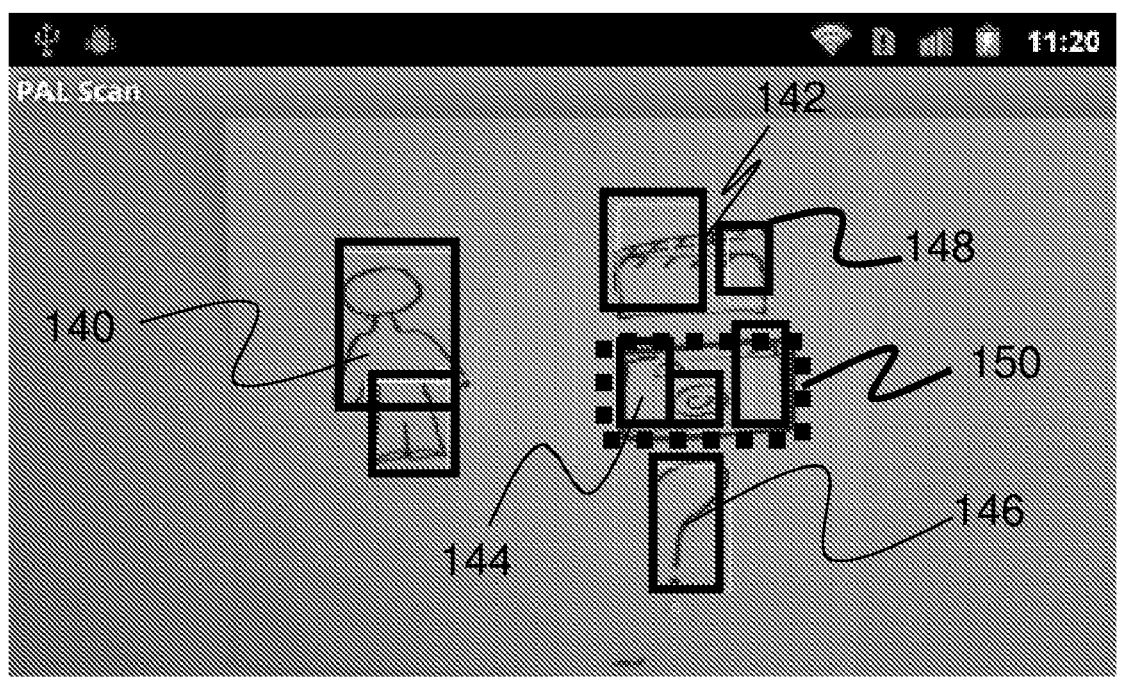
FIGS. 6B and 6C illustrate a user-initiated modification of the detected components of FIG. 6A, according to one embodiment of the invention.
Figure 6C:
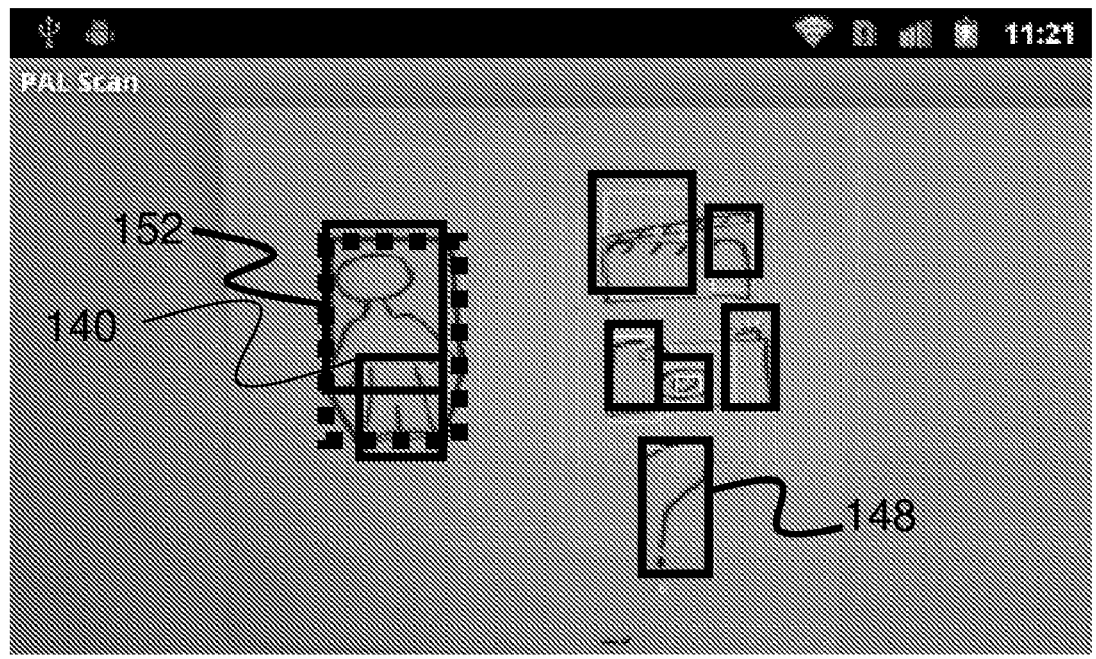

On their own, the component bounding boxes 148 are not useful to segment the image. However, only a small amount of user input can render a region useful. In FIG. 6B, the user has provided an input to the center of the object 144 represented by the camera. The application detects not only the location of the user input, such as a touch on a touchscreen display, but also the radial extent of the touch area, which corresponds to the area of the screen engaged by the user's finger. The system then determines the intersection of the touch area with the set of component bounding boxes. The points of the overlapping bounding boxes are then sent to a convex hull algorithm, which outputs a hull 150 in the shape of a polygon that minimally contains all of the bounding boxes 148 which encompass the camera object 144. FIG. 6C illustrates an example of a hull 152 which contains object 140 represented by the stick figure. The result of the hull algorithm is a region represented by the hull that approximates the area of the underlying object.

Figure 6D:
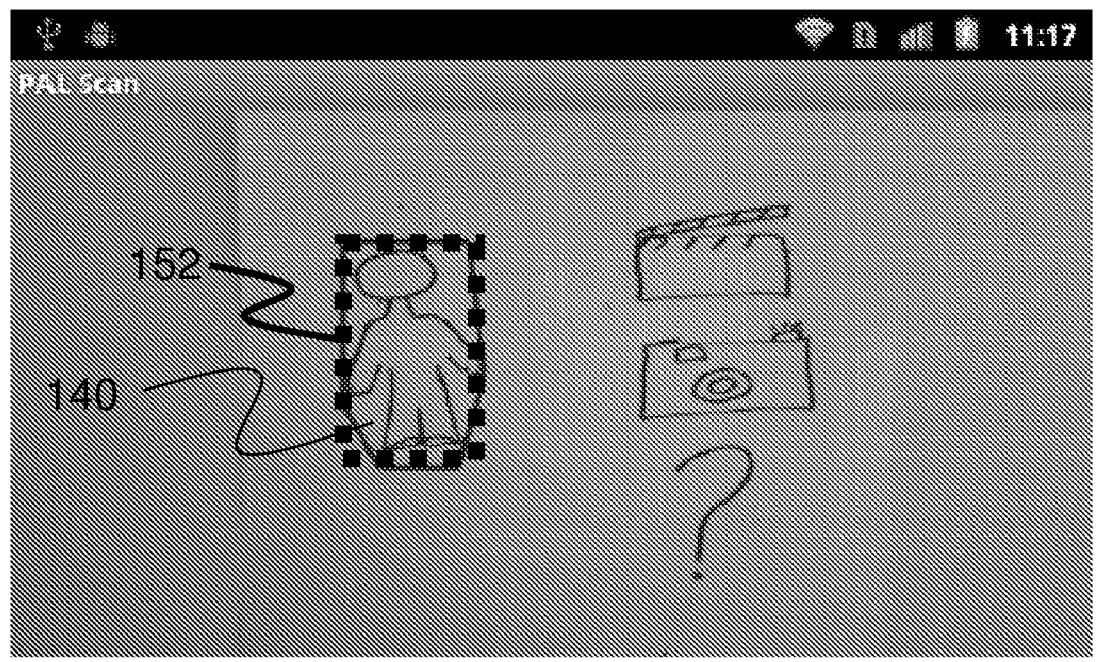
FIG. 6D illustrates a resulting view of a region of the image which was made up of a plurality of components.

In one embodiment, shown in FIG. 6D, the bounding boxes themselves would not be shown to the user—the user would only see the final hull 152.

In one embodiment, if the user selects a region that does not intersect a bounding box, an artificial bounding box is created beneath their selection with sides equal to the radius of the touch area. Thus, in the worst case (no bounding boxes found)

this process requires users to swipe the entire region to create a large bounding box equal to the radial extent of the touch area, while in the best case (a bounding box covers a sketch perfectly) the region is determined immediately upon a user touching the area to be annotated. Furthermore, unlike other techniques that use principles of perceptual organization to group strokes, this method should be robust to any non-sketch content attached to a sketch surface, which may be an additional layer such as a sheet of paper stuck to the whiteboard or a sticky note stuck to a piece of paper.

IV. Annotating Content

Figure 7A:
FIGS. 7A-7D illustrate a graphical user interface (GUI) and process for creating an annotation for a selected region, according to one embodiment of the invention.
Figure 7B:
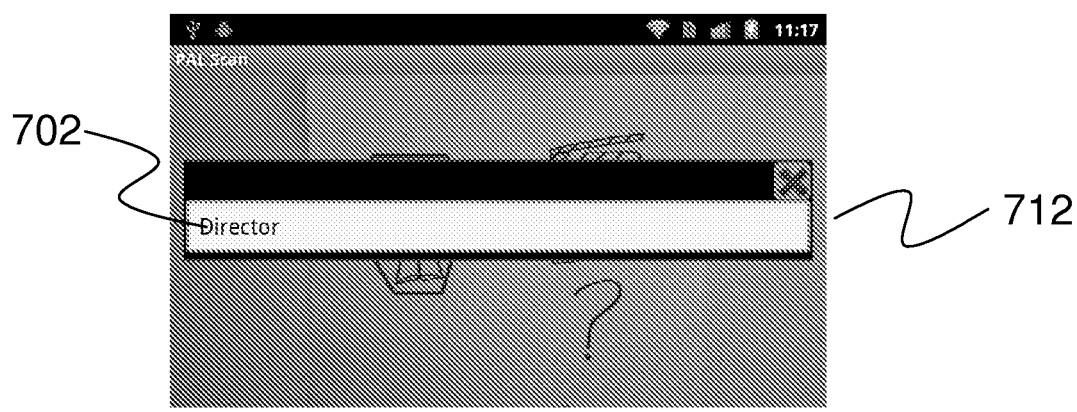
Figure 7C:
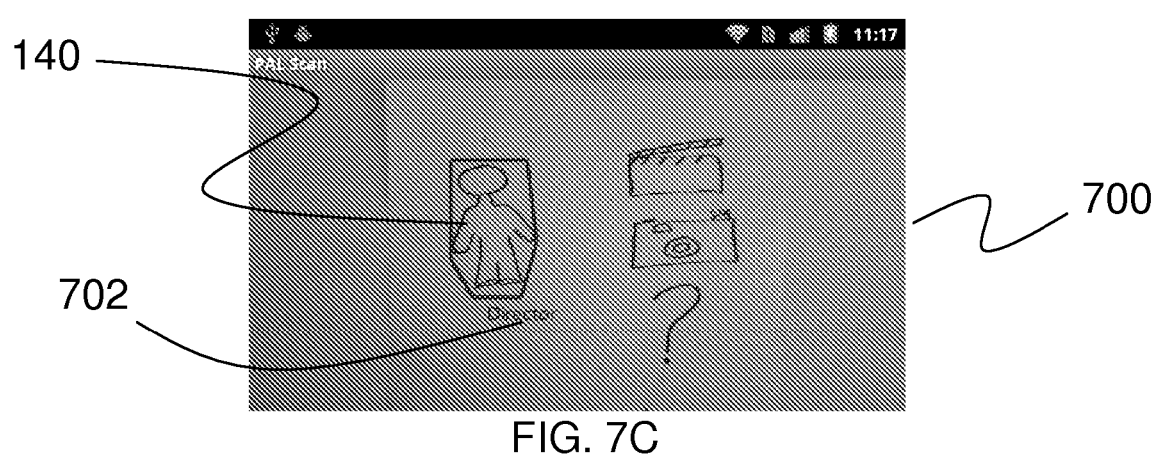
Figure 7D:
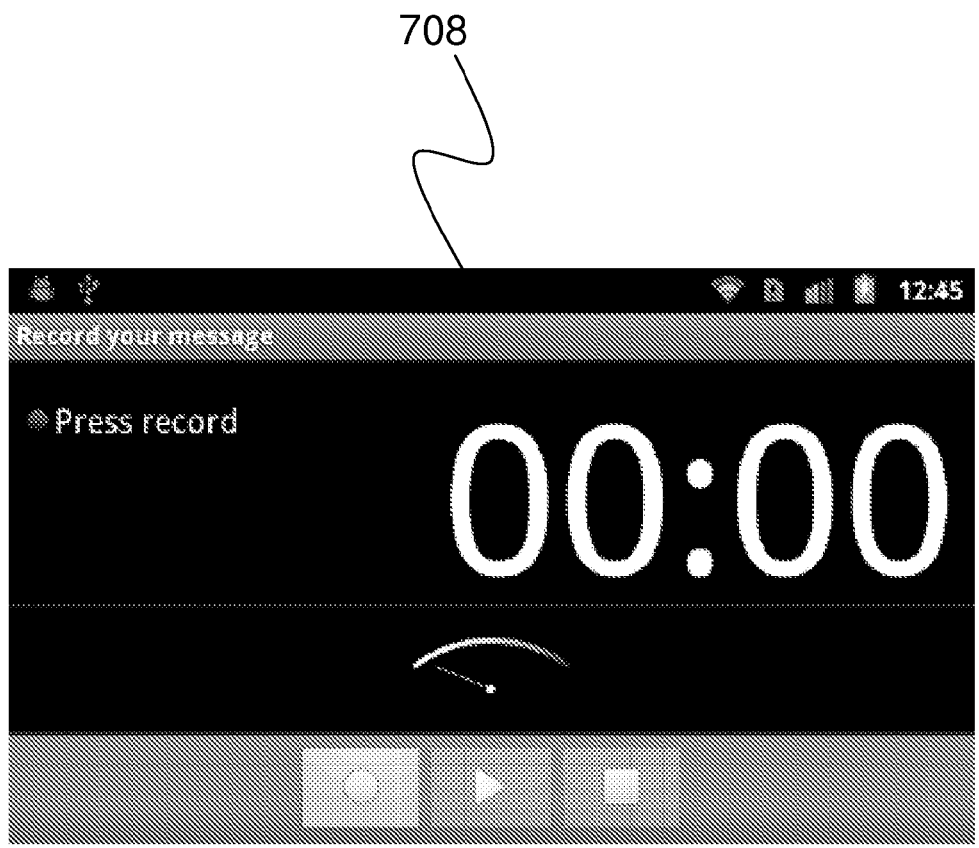

After the system has identified at least one region, the user can begin annotating the regions with unique content for each region. The annotations could be written on or around the regions or created as audio annotations. FIG. 7A illustrates a graphical user interface (GUI) 700 which may be displayed when a user provides an input indicating that an annotation is desired on a selected region. The user can then type an annotation 702 into the user interface using the displayed keyboard 704, or the user can select the audio input button 706, which will provide the user with a separate audio player GUI 708 with which to record an audio annotation, as illustrated in FIG. 7D. In FIG. 7A, once the user has entered the written annotation 702, the user selects the "Done" button 710 and is then shown a smaller GUI 712 displaying only the input annotation, as illustrated in FIG. 7B. If the annotation 702 appears to be correct, the user can close the GUI 712 and the annotation 702 will then appear next to the selected object 140, as illustrated in FIG. 7C. One of skill in the art will appreciate that all types of annotations can be made, including video annotations, digitally-sketched annotations, and others. Annotations that are made to the regions can then be reassembled into a time-based animation on the server 104.

Once the annotations have been completed, the image and annotations are sent from the mobile device 102 to the server 104 for further image processing and creation of the video.

V. Creating a Video

Figure 8A:
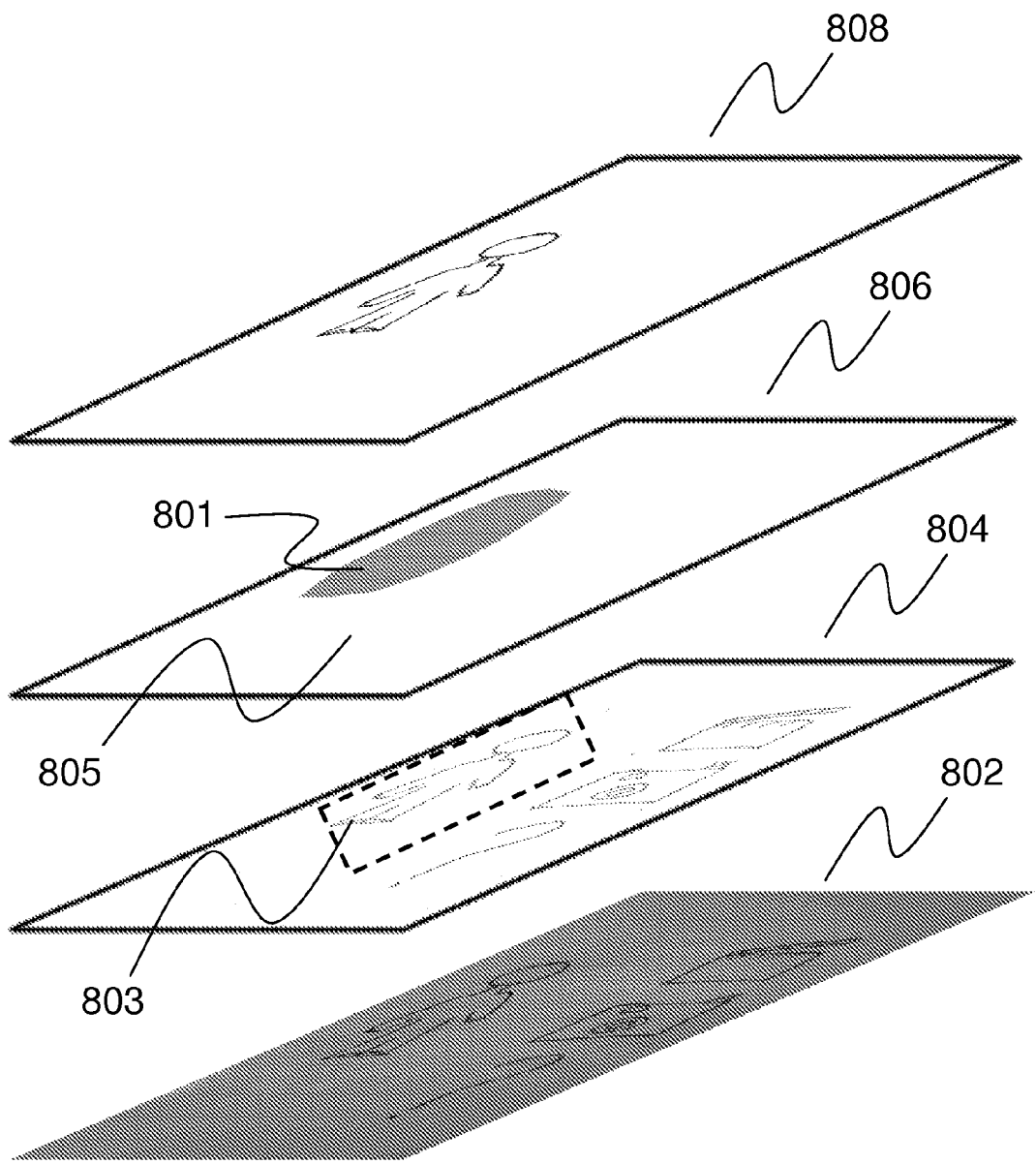
FIGS. 8A-8E illustrate the process of using a mask to reveal selected regions of the image for creating a video of the selected regions and corresponding annotations, according to one embodiment of the invention.

Upon receiving the image and annotations, the server 104 runs the image through a standard image cleaning algorithm, as is known to one of skill in the art. One example of an image cleaning algorithm is described in E. Saund, T. P. Morgan, *A perceptually-supported sketch editor*; UIST, pages 175-184 (1994), incorporated herein by reference. The image cleaning results in a "mask" 804 that excludes all regions of the image that are not strokes, such as shadows, blurry areas, wrinkles and other artifacts, an example of which is illustrated in FIG. 8A. An illustration of the mask 804 and layers of the image which are used to create a video is illustrated in FIG. 8A. A first layer on the bottom represents the original captured image 802, and the second layer immediately above the original image 802 is the mask 804. The third layer illustrates a first convex hull region 806 with a hull 801 around a first selected region 803 corresponding to components of the first group. The gray hull 801 provides for the content in the first selected region 803 of the original image 802 to pass through this third layer, while the white area 805 outside the hull provides for the content of the original image to be removed. The fourth layer is a first composite region 808 of the lower three layers which has selectively applied the mask 804 to the original image 802 in order to reveal only a portion of the original image 802 corresponding to the first selected region 803 in the first composite region 808.

Figure 8B:
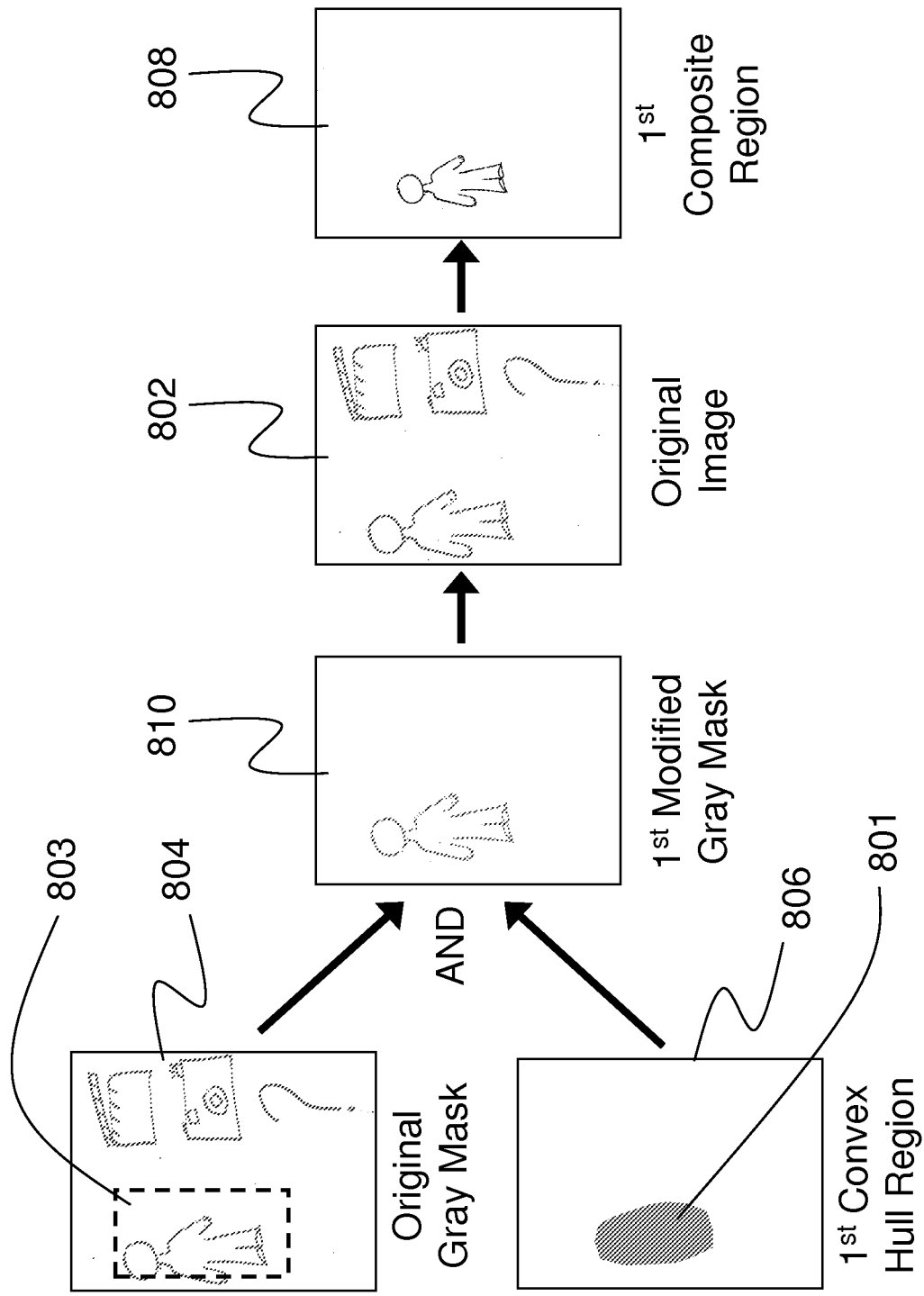

A server can create a video that progressively reveals the contents of the image by applying a series of "AND" and "OR" operations to the mask and inputting annotation regions. Referring to FIG. 8B, an "AND" operation is applied to the gray mask 804 and a first convex hull region 806 to yield a first modified gray mask 810. The first modified gray mask 810 is then applied to the original image 802 to yield a first composite region 808. It should be noted that the first composite region 808 appears very similar to the modified gray mask 810; however, the modified gray mask 810 is only a mask and therefore contains no color information. If the original image 802 were blue, the modified gray mask 810 would not change, but the first composite region 808 would be blue. This same process is then repeated for each selected region in sequence, as will be further described below.

Figure 8C:
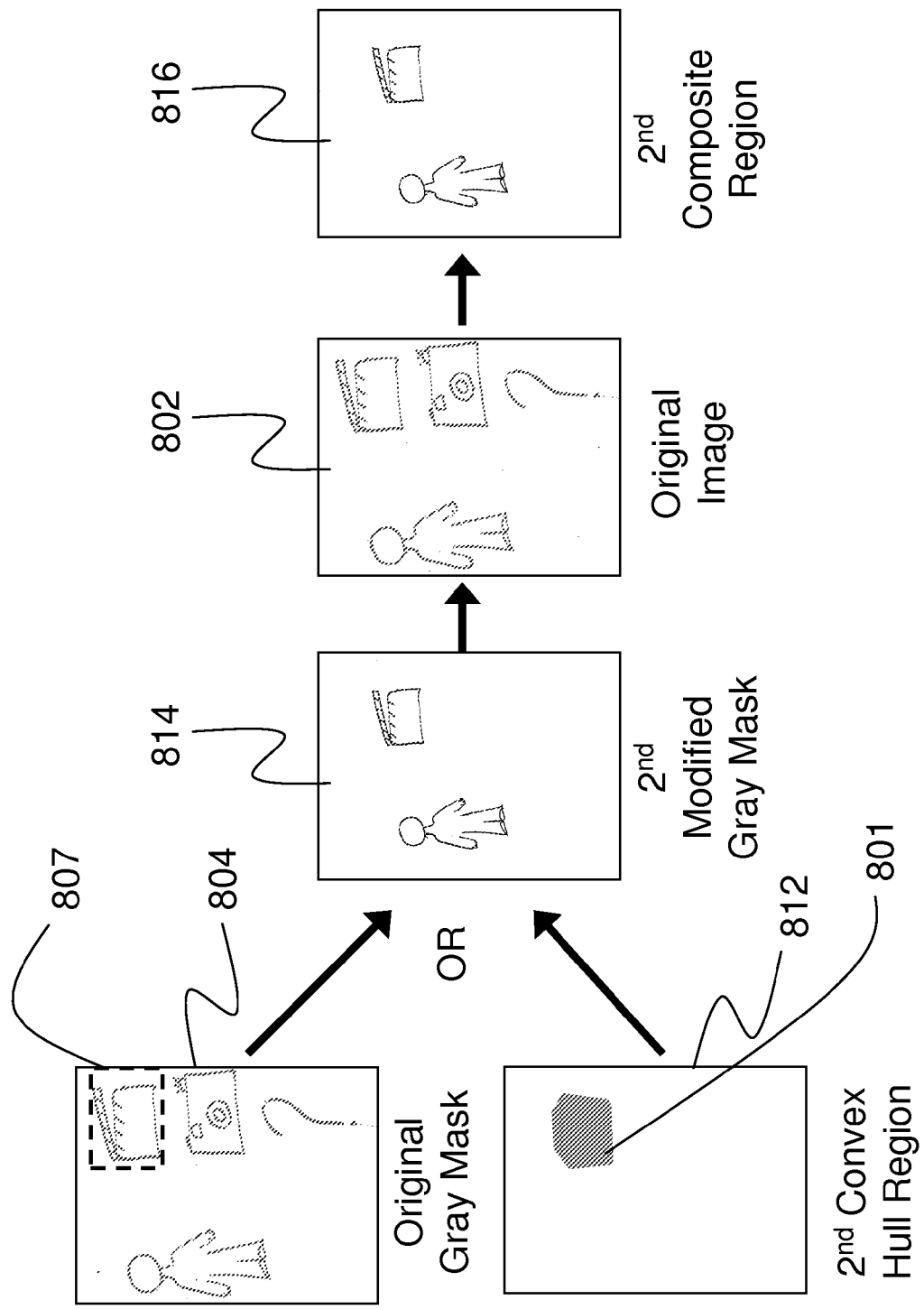

As shown in FIG. 8C, this same process is repeated for a second selected region 807 and corresponding second convex hull region 812 using an "OR" operation with the first modified gray mask 810 to form a second modified gray mask 814. The second modified gray mask 814 is combined with the original image 802 to yield the second composite region 816.

Figure 8D:
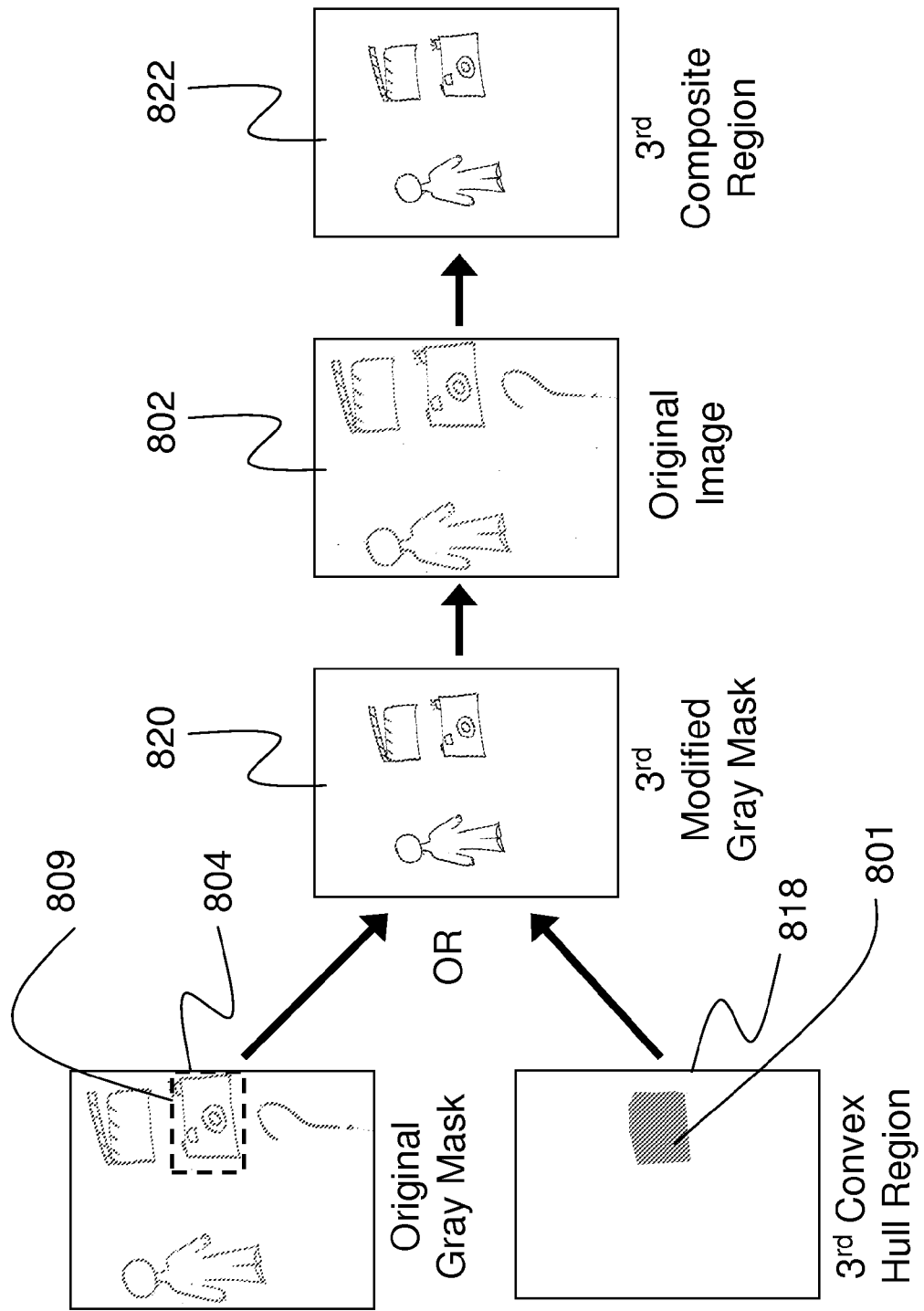

FIG. 8D illustrates the next step in the process for a third selected region 809, which is combined with a corresponding third convex hull region 818 using an "OR" operation with the second modified gray mask 814 to form a third modified gray mask 820. The third modified gray mask 820 is combined with the original image 802 to yield the third composite region 822.

Figure 8E:
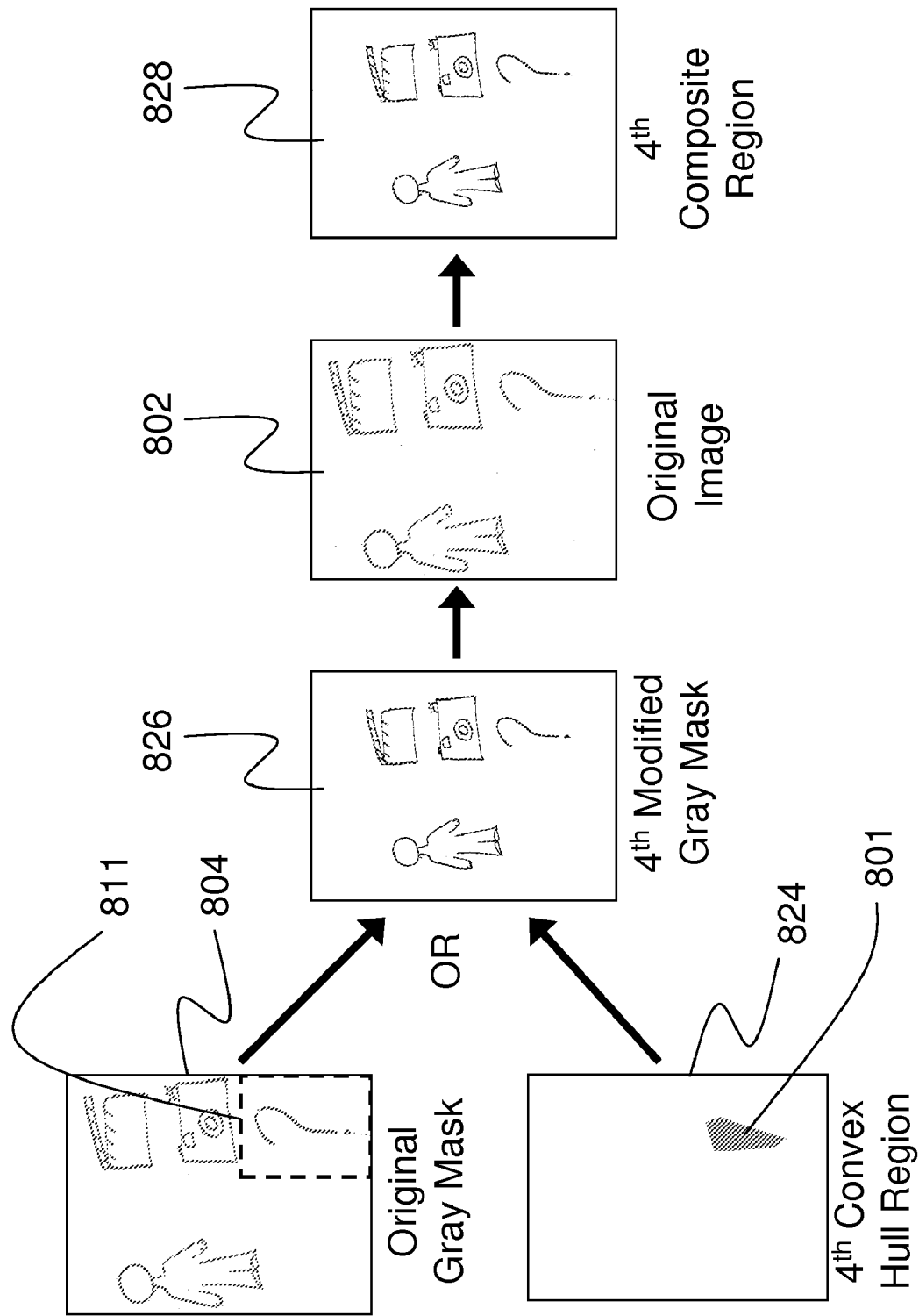

FIG. 8E illustrates the next step in the process for a fourth selected region 811, which is combined with a corresponding fourth convex hull region 824 using an "OR" operation with the third modified gray mask 820 to form a fourth modified gray mask 826. The fourth modified gray mask 826 is combined with the original image 802 to yield the fourth composite region 828.

For example, consider the scenario in which the user wants to progressively reveal objects 140, 142, 144 and 146 of FIG. 5 along with associated annotations. On the mobile device 102, the user selects each identified region—corresponding to each of the objects 140, 142, 144 and 146 in FIG. 5—and annotates them using the process described above. In this particular embodiment, the annotations are audio annotations that the user records for each object. Once all of the composite regions are created, the composite regions can be layered together with the annotations to create a video. One embodiment of a video using audio annotations is illustrated in FIGS. 9A-9D. In FIG. 9A, the resulting video first displays the first composite region 808 corresponding to object 140 and plays a corresponding first audio annotation (not shown). In FIG. 9B, once the first audio annotation is finished playing, second composite region 816 (corresponding to object 142) is displayed along with first composite region 808 and a corresponding second audio annotation is played. In FIG. 9C, once the second audio annotation is finished playing, third composite region 822 (corresponding to object 144) is displayed along with first composite region 808 and second composite region 816, and a corresponding third audio annotation is played. Finally, in FIG. 9D, once the third audio annotation is finished playing, fourth composite region 828 (corresponding to object 146) is displayed along with first composite region 808, second composite region 816 and third composite region 822, and a corresponding fourth audio annotation is played.

Once the specific sequence of annotated regions is created, the server may send these images and their corresponding audio annotations to a video creation tool to create the video. The images and annotations may also be exported to an interactive multimedia document, where the user can manually control playback of the sequence by clicking on a portion of the document to move the sequence forward or backwards as needed. The interactive multimedia document allows the user to skip forward and backward (such as moving from the image in FIG. 9A directly to the image in FIG. 9C). The interactive multimedia document is also useful on the mobile device, and such a document may be shown to the user on the mobile device to preview their sequence before it is sent to the server. In one embodiment, the video is an FFmpeg, although other embodiments could include an HTML-based animation (using HTML-5), Scalable Vector Graphics (SVG), or any language which can be programmed to pan and scan through an image file and play back audio to reveal the frames as the audio segments are played.

VI. Sharing the Video

The video may then be shared with other users, such as by sending the video by e-mail or posting the video to a web page or shared database. In one embodiment, other users that may be interested in receiving the video can be identified by determining the proximity of the other users to the content, and assuming that the users close to the content would be interested in receiving the video. One example of a proximity-based system is an indoor location system such as MyUnity, which will suggest additional users who may want a copy of the captured image or resulting video.

VII. Computer Embodiment

Figure 10:
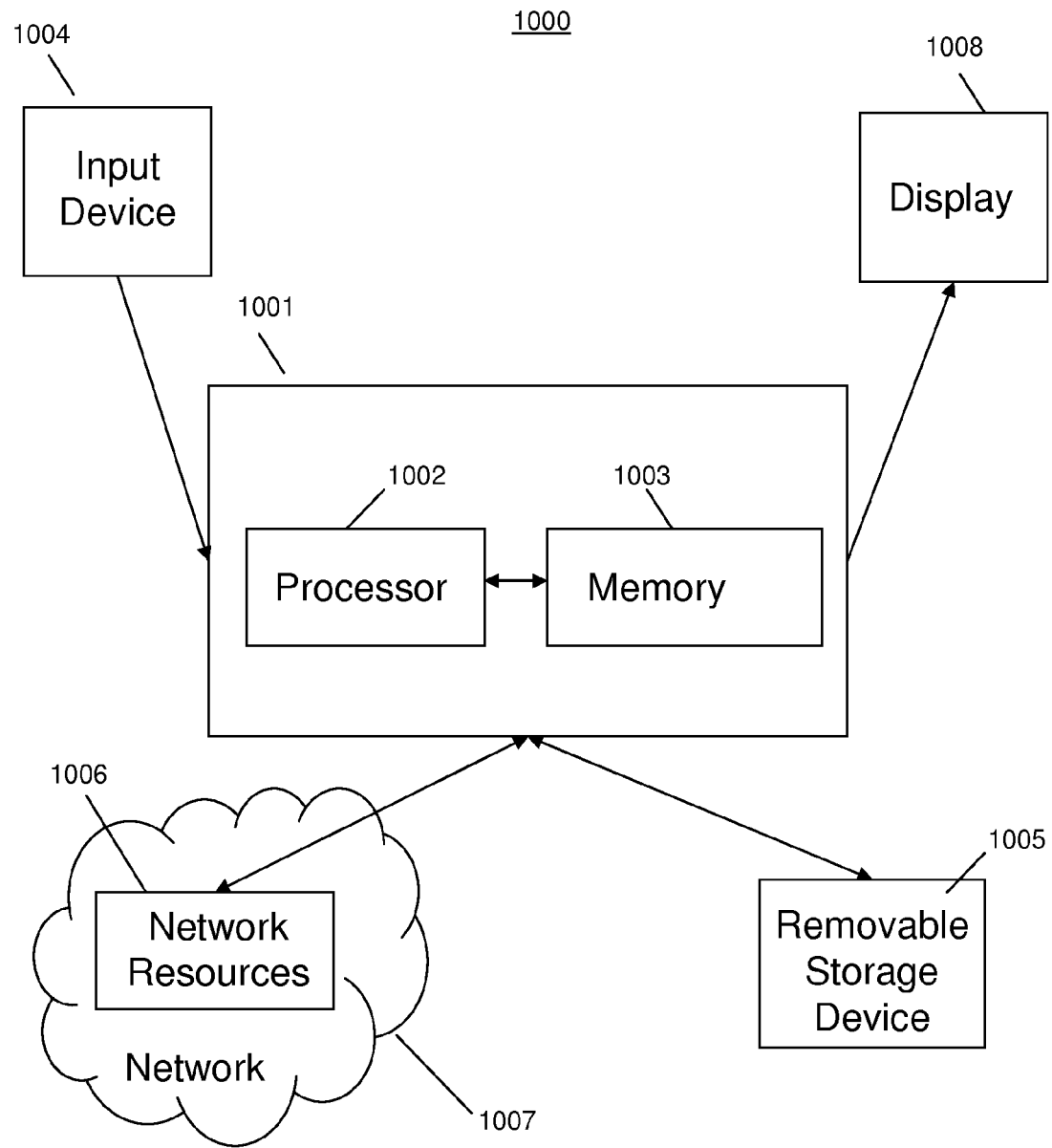
FIG. 10 is a block diagram of a computer system upon which the system may be implemented.

FIG. 10 is a block diagram that illustrates an embodiment of a computer/server system 1000 upon which an embodiment of the inventive methodology may be implemented. The system 1000 includes a computer/server platform 1001 including a processor 1002 and memory 1003 which operate to execute instructions, as known to one of skill in the art. The term "computer-readable storage medium" as used herein refers to any tangible medium, such as a disk or semiconductor memory, that participates in providing instructions to processor 1002 for execution. Additionally, the computer platform 1001 receives input from a plurality of input devices 1004, such as a keyboard, mouse, touch device or verbal command. The computer platform 1001 may additionally be connected to a removable storage device 1005, such as a portable hard drive, optical media (CD or DVD), disk media or any other tangible medium from which a computer can read executable code. The computer platform may further be connected to network resources 1006 which connect to the Internet or other components of a local public or private network. The network resources 1006 may provide instructions and data to the computer platform from a remote location on a network 1007. The connections to the network resources 1006 may be via wireless protocols, such as the 802.11 standards, Bluetooth® or cellular protocols, or via physical transmission media, such as cables or fiber optics. The network resources may include storage devices for storing data and executable instructions at a location separate from the computer platform 1001. The computer interacts with a display 1008 to output data and other information to a user, as well as to request additional instructions and input from the user. The display 1008 may therefore further act as an input device 1004 for interacting with a user.

The embodiments and implementations described above are presented in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

What is claimed is:

1. A system for capturing and organizing annotated content, comprising:
   a content capturing unit which captures an image of content using a camera on a mobile device;
   a region defining unit on the mobile device which defines and identifies at least one region of the image which includes captured content to be annotated;
   an annotation unit on the mobile device which receives user-created annotations which correspond to the at least one region of the captured content; and
   a video creation unit located on a server connected with the mobile device which organizes the captured content and the user-created annotations into a specific sequence and creates a video of the specific sequence, wherein the video creation unit at the server creates the video of the specific sequence automatically without user control at the server.

2. The system of claim 1, wherein the content capturing unit obtains information related to the content from a content information server on a network connected with the mobile device.

3. The system of claim 1, wherein the content is information which appears on a whiteboard, and wherein the content capturing unit receives the entire content of the whiteboard using a code or electronic tag located around the whiteboard that is identified by the mobile device as a link to an image of the entire content of the whiteboard on a network connected with the mobile device.

4. The system of claim 1, wherein the region defining unit extracts bounding boxes of at least one object in the content and receives a user input at a location in the at least one region which identifies a surface area of the object.

5. The system of claim 4, wherein an artificial bounding box is created with a surface area equal to a radius of a touch area if the user input does not intersect a bounding box.

6. The system of claim 1, wherein the user-created annotations are audio recordings created on the mobile device.

7. The system of claim 1, wherein the user-created annotations are written notations created on the mobile device.

8. The system of claim 1, wherein the video creation unit generates a mask which hides portions of the at least one region or user-created annotations so that the hidden portions of the at least one region or user-created annotations are progressively revealed during playback of the video.

9. The system of claim 1, further comprising a sharing unit which distributes the video to at least one second user.

10. The system of claim 9, wherein the sharing unit distributes the video to users which are located in close proximity to the content.

11. A method for capturing and organizing annotated content, comprising:
    capturing an image of content using a camera on a mobile device;
    defining and identifying at least one region of the image on the mobile device, the at least one region including captured content to be annotated;
    receiving user-created annotations on the mobile device, wherein the annotations correspond to the at least one region of the captured content; and
    organizing the captured content and the user-created annotations into a specific sequence and creating a video of the specific sequence using a server with a processor and a memory which is connected with the mobile device, wherein the creating the video at the server creates the video of the specific sequence automatically without user control at the server.

12. The method of claim 11, further comprising obtaining information related to the content from a content information server on a network connected with the mobile device.

13. The method of claim 11, wherein the content is information which appears on a whiteboard, and wherein the entire content of the whiteboard is received using a code or electronic tag located around the whiteboard that is identified by the mobile device as a link to an image of the entire content of the whiteboard on a network connected with the mobile device.

14. The method of claim 11, wherein the at least one region of the image is identified and defined by extracting bounding boxes of at least one object in the content and receiving a user input at a location in the at least one region which identifies a surface area of the object.

15. The method of claim 14, wherein an artificial bounding box is created with a surface area equal to a radius of a touch area if the user input does not intersect a bounding box.

16. The method of claim 11, wherein the user-created annotations are audio recordings created on the mobile device.

17. The method of claim 11, wherein the user-created annotations are written notations created on the mobile device.

18. The method of claim 11, wherein organizing the captured content and the user-created annotations into a specific sequence comprises generating a mask which hides portions of the at least one region or user-created annotations so that the hidden portions of the at least one region or user-created annotations are progressively revealed during playback of the video.

19. The method of claim 11, further comprising distributing the video to at least one second user.

20. The method of claim 19, wherein the video is distributed to users which are located in close proximity to the content.

* * * * *